United States Patent [19]

Michiyuki et al.

[11] Patent Number: 5,644,970

[45] Date of Patent: Jul. 8, 1997

[54] BEARING ARRANGEMENT IN SWASH PLATE TYPE COMPRESSOR WITH DOUBLE HEADED PISTONS

[75] Inventors: Hiromi Michiyuki; Masanobu Yokoi; Yasunori Ueda; Hayato Ikeda, all of Kariya, Japan

[73] Assignee: Kabushiki Kaisha Toyoda Jidoshokki Seisakusho, Kariya, Japan

[21] Appl. No.: 561,409

[22] Filed: Nov. 21, 1995

[30] Foreign Application Priority Data

Nov. 22, 1994 [JP] Japan .................. 6-288367

[51] Int. Cl.[6] ............................. F01B 3/00
[52] U.S. Cl. .................. 92/71; 417/269; 74/60
[58] Field of Search ............... 92/12.2, 71; 417/269; 91/499; 74/60

[56] References Cited

U.S. PATENT DOCUMENTS

| 3,934,956 | 1/1976 | Pitner . | |
|---|---|---|---|
| 4,974,702 | 12/1990 | Yokomachi et al. | 417/269 |
| 5,233,913 | 8/1993 | Murihead | 92/71 |
| 5,370,503 | 12/1994 | Terauchi | 417/222.2 |
| 5,419,685 | 5/1995 | Fujii et al. | 417/269 |
| 5,528,976 | 6/1996 | Ikeda et al. | 92/71 |

FOREIGN PATENT DOCUMENTS

| 0515957 | 12/1992 | European Pat. Off. . |
| 19542945 | 5/1996 | Germany . |
| 54-170410 | 12/1979 | Japan . |
| 64-63669 | 3/1989 | Japan . |
| 6463669 | 3/1989 | Japan . |

Primary Examiner—Thomas E. Denion
Attorney, Agent, or Firm—Burgess, Ryan & Wayne

[57] ABSTRACT

A swash plate type compressor including double headed pistons, a swash plate, and a drive shaft which is rotatably supported by radial bearings and thrust bearings. A boss on the swash plate has front and rear supporting seats and the cylinder block have front and rear supporting seats in a facing relationship with the front and rear supporting seats of the swash plate. One thrust bearing is rigidly arranged between the facing supporting seats. The other thrust bearing is held between the other facing supporting seats, with a belleville spring arranged between the thrust bearing and the supporting seat of the boss.

7 Claims, 2 Drawing Sheets

BEARING ARRANGEMENT IN SWASH PLATE TYPE COMPRESSOR WITH DOUBLE HEADED PISTONS

BACKGROUND OF THE INVENTION

1. Field of the Invention

The present invention relates to a swash plate type compressor having double headed pistons, and in particular, it relates to an improved thrust bearing arrangement for supporting an axial load in a swash plate type compressor.

2. Description of the Related Art

Swash plate type compressors are often used in refrigerating systems in vehicles. The swash plate type compressor disclosed in Japanese Unexamined Patent Publication (Kokai) No. 64-63669, for example, is one in which a swash plate is fixed to a drive shaft which is rotatably supported in a cylinder block by front and rear radial bearings and front and rear thrust bearings. The cylinder block comprises axially arranged front and rear cylinder block halves, and front and rear housings are attached to the cylinder block. The front thrust bearing is arranged between the front inner wall portion of the cylinder block and the boss of the swash plate, and the rear thrust bearing is arranged between the boss of the swash plate and the rear inner wall portion of the cylinder block. The front and rear cylinder block halves and the front and rear housings are fastened together by fastening means such as fastening bolts, and the front and rear thrust bearings are simultaneously fastened between the boss and the wall portions by the fastening bolts.

The thrust bearing comprises an inner ring, an outer ring, rollers, and a retainer. A first annular supporting projection having a larger diameter is provided on each of the opposite surfaces of the boss of the swash plate so that the inner ring of the thrust bearing abuts against the first annular supporting projection. A second annular supporting projection having a smaller diameter is provided on each of the opposite surfaces of the wall portion of the cylinder block so that the outer ring of the thrust bearing abuts against the second annular supporting projection. Each of the thrust bearings is pinched between the first and second annular supporting projection and can be elastically deformed due to the difference of the diameters of the first and second annular supporting projections when the fastening bolts are tightened to assemble the compressor, whereby a variation in an axial fastening length or fastening force of the fastening bolts is absorbed by the elastic deformation of the thrust bearings.

However, in this thrust bearing arrangement, the inner and outer rings, the rollers, and the retainers are subjected to a relatively strong load, and therefore, a very high quality control is requested. Also, the life of the thrust bearings may be shortened and the reliability of the compressor may be affected.

The swash plate type compressor also includes an electromagnetic clutch by which the compressor is driven from an engine of a vehicle. When the electromagnetic clutch is turned on and the compressor is driven, the coolant gas is compressed and a compression reaction force acts on the swash plate. The compression reaction force is then transmitted to and supported by the thrust bearings. The elastically deformable arrangement of the thrust bearings due to the difference of the diameters of the first and second annular supporting projections, can be considered to be an equivalent of an arrangement in which spring elements are arranged on either side of the swash plate. The compression reaction force induces a moment on the swash plate, and the spring elements arranged on either side of the swash plate interfere with each other to cause the swash plate to oscillate unstably. The oscillation may cause noise, including audible high frequency components, to appear during high speed rotation.

Also, Japanese Unexamined Utility Model Publication (Kokai) No. 54-170410 discloses a swash plate type compressor, in which the boss of the swash plate and the inner wall portion of the cylinder block have facing flat supporting seats, and each thrust bearing is rigidly arranged between the facing flat supporting seats of the boss and the wall portion of the cylinder block. However, in this arrangement, a management of an axial fastening length, i.e., a fastening force, of the fastening bolts is very difficult. If a member fastened by the fastening bolts is made of aluminum alloy, it is impossible to absorb a variation in a fastening force derived from thermal expansion of aluminum alloy.

SUMMARY OF THE INVENTION

The object of the present invention is to solve the above described problems and to provide a swash plate type compressor which has reduced oscillation and noise and a simple structure, and in which the life of the thrust bearings can be prolonged.

According to the present invention, there is provided a swash plate type compressor comprising a cylinder block comprising axially arranged front and rear cylinder block halves, said cylinder block having a central bore, a plurality of cylinder bores around the central bore, a crank chamber intersecting the central bore and the cylinder bores, and inner wall portions having said central bore arranged therein and axially opposite front and rear supporting seats; front and rear housings attached to the cylinder block and having central bores; double headed pistons arranged in the respective cylinder bores to form compression chambers on either side of the pistons; a drive shaft inserted in the central bores of the front housing and the cylinder block and rotatably supported by front and rear radial bearings and front and rear thrust bearings; and a swash plate arranged in the crank chamber and fixed to the drive shaft to engage with the pistons for reciprocatingly moving the pistons, said swash plate having a boss having axially opposite front and rear supporting seats, the front and rear supporting seats of the boss of the swash plate facing the front and rear supporting seats of the inner wall portions of the cylinder block, respectively. The compressor is characterized in that one of the front and rear thrust bearings is rigidly arranged between one pair of the facing supporting seats; the other of the front and rear thrust bearings is arranged between the other pair of the facing supporting seats; and a belleville spring is arranged between said other thrust bearing and the supporting seat of the boss of the swash plate.

In this arrangement, the cylinder block halves, the housings, and the thrust bearings can be fastened together by fastening bolts, with the swash plate held between the thrust bearings. A variation in an axial fastening length or a fastening force of the fastening bolts is absorbed by the cushion function of the belleville spring, and it is possible to easily and stably control the fastening force of the fastening bolts. In addition, the thrust bearings and the swash plate have a superior abrasion resistance, compared with the cylinder block, and the belleville spring is arranged between those thrust bearings and swash plate. Accordingly, damage to the thrust bearings and the supporting seats of the swash plate, occurring while the belleville spring is moved with the swash plate, may be small, and it is not necessary to provide any measure to deal with a damage of the supporting seat, for example, it will not be necessary to provide a special plate or the like to receive the belleville spring.

When the compressor is driven, a moment acts on the swash plate, based on a compression reaction force. The thrust bearing which is rigidly held and thus has no cushion function effectively restricts an unstable oscillation of the swash plate by the rigidity arrangement, and on the other hand, a variable axial load is efficiently absorbed by the cushion function of the belleville spring.

Preferably, the compressor further comprises an electromagnetic clutch attached to the front end of the drive shaft, and the rigidly supported thrust bearing is arranged on the rear side of the swash plate.

The electromagnetic clutch has an armature which is connected to the drive shaft via an elastic member and the drive shaft is subjected to a force in the rearward direction of the compressor when the armature is attracted. If the belleville spring is arranged on the rear side of the swash plate, the belleville spring is elastically deformed and the drive shaft is allowed to move in the rearward direction, with the result that the effect of restricting an unstable oscillation of the swash plate by the rigidly supported thrust bearing is cancelled. In fact, however, since the rigidly supported thrust bearing is arranged on the rear of the swash plate (and the belleville spring is arranged on the front side of the swash plate), the swash plate is rigidly supported by the rigidly supported thrust bearing against the force in the rearward direction by the armature and an unstable oscillation of the swash plate is effectively prevented.

Preferably, the front radial bearing is arranged at such a position that the distance between an axially central point of the boss of the swash plate and the front radial bearing is longer than the distance between the central point of the boss of the swash plate and the rear radial bearing, and the rigidly supported thrust bearing is arranged on the front side of the swash plate.

The distance between a pair of the radial bearings is determined in consideration with a bend and a tilt of the drive shaft, and a moment induced by the compression reaction force and acting on the swash plate is mainly supported by three components, i.e., the rigidly supported thrust bearing, the drive shaft, and the radial bearing which is arranged on the other side of the swash plate from the rigidly supported thrust bearing. In the above defined distance relationship, since the distance between the supporting seat of the boss of the swash plate facing the rigidly supported thrust bearing and the rear radial bearing can be reduced, a bend in the drive shaft becomes small and a load acting on the rigidly supported thrust bearing is mitigated, so it is possible to prevent a possible occurrence of flaking.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 3:
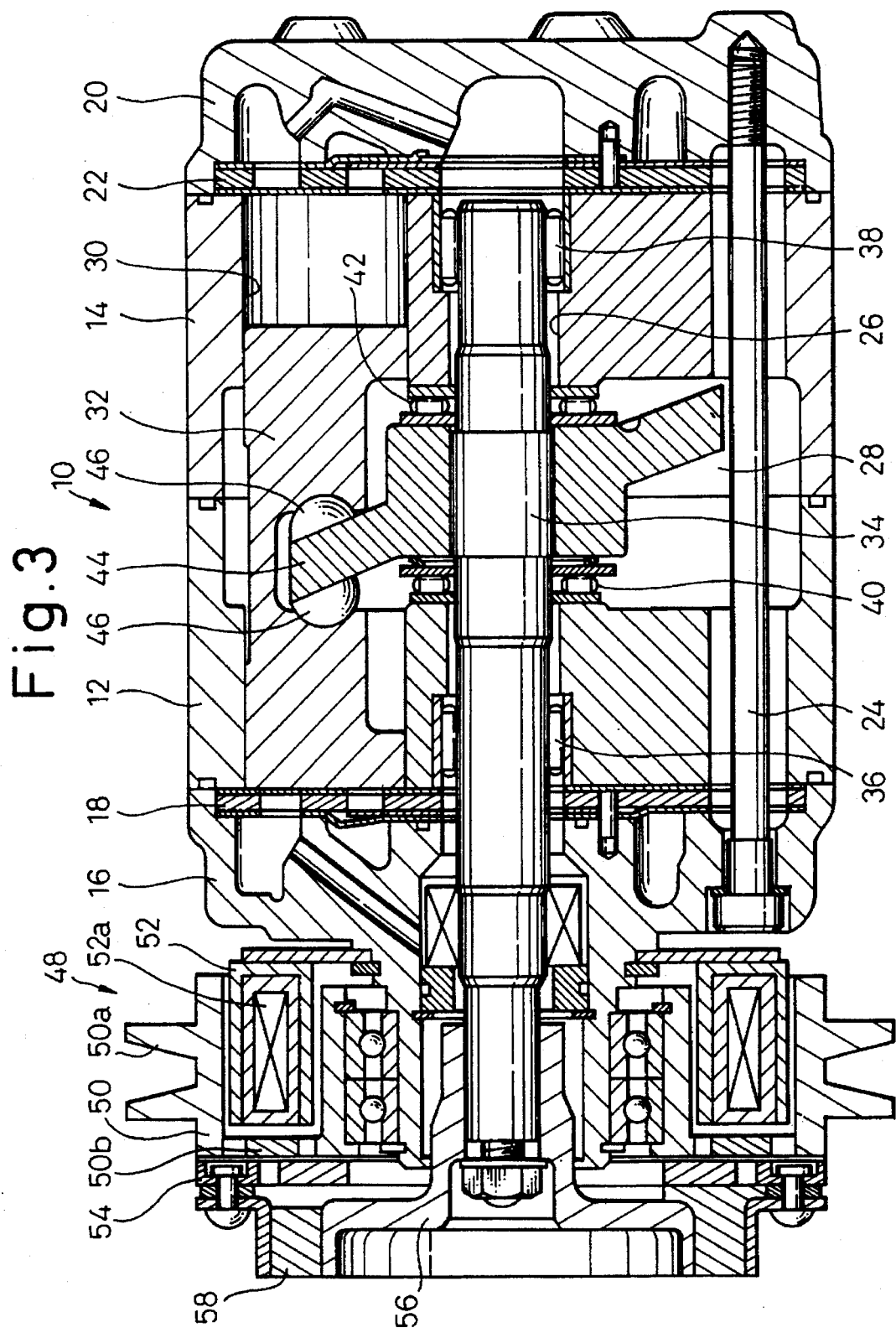
FIG. 3 is a cross-sectional view of the entire compressor.

FIG. 3 shows a swash plate type compressor 10. The compressor 10 includes a cylinder block comprising front and rear cylinder block halves 12 and 14. A front housing 16 is attached to the cylinder block half 12 via a valve plate 18 and a rear housing 20 is attached to the rear cylinder block half 14 via a valve plate 22. A plurality of fastening bolts 24 extend from the front housing 16 through the cylinder block halves 12 and 14 to the rear housing 20 to fasten these members together. The valve plates 18 and 22 have suction valves and discharge valves arranged in a known manner, and the housings 16 and 20 have suction chambers and discharge chambers arranged in a known manner.

The cylinder block has a central bore 26, a plurality of cylinder bores 28 arranged around the central bore 26, and a crank chamber 28 intersecting the central bore 26 and the cylinder bores 30. Double headed pistons 32 are reciprocatingly inserted in the respective cylinder bores 30. A drive shaft 34 is inserted in a central bore of the front housing 16 and in the central bore 26 of the cylinder block and supported by front and rear radial bearings 36 and 38 and front and rear thrust bearings 40 and 42. A swash plate 44 is arranged in the crank chamber 28 and fixed to the drive shaft 34 to engage with the intermediate portions of the pistons 32 via semi-spherical shoes 46. Therefore, the double headed pistons 32 are reciprocatingly moved by the swash plate 44 when the drive shaft 34 rotates.

An electromagnetic clutch 48 is mounted to the left end of the drive shaft 34. The electromagnetic clutch 48 comprises an annular rotor 50 having a pulley portion 50a and a friction disk portion 50b, a stator 52 having a coil 52a, and an armature 54 arranged to face the friction disk portion 50b. The armature 54 is connected to a hub member 56 via an elastic ring 58, the hub member 56 being fixed to the left end of the drive shaft 34. The pulley portion 50a can be driven by an engine of a vehicle. When a current is supplied to the coil 52a, the armature 54 is attracted to the friction disk portion 50b, so the drive shaft 34 is driven by the engine via the rotor 48, the armature 54, and the hub member 56, while the elastic ring 58 is elastically deformed. Therefore, the drive shaft 34 is subjected to a force in the rearward direction of the compressor by the armature 54. Therefore, when the compressor is driven, the pistons 32 are reciprocatingly moved to repeat suction and compression strokes. A cooling gas is introduced into compression chambers on either side of the pistons 32 in the cylinder bores 30, compressed in the compression chambers, and discharged.

Figure 1:
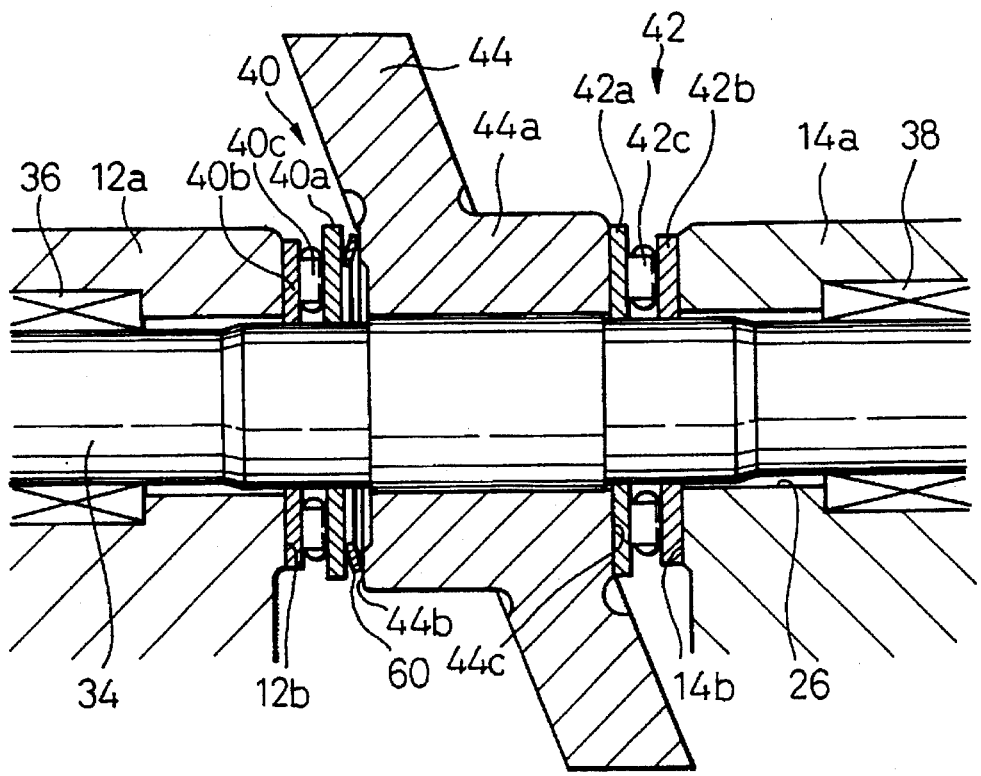
FIG. 1 is a partial cross-sectional view of a swash plate type compressor according to the first embodiment of the present invention.

FIG. 1 shows the detail of a portion of the compressor 10 of FIG. 3. The swash plate 44 has a hub 44a having a front supporting seat 44b and a rear supporting seat 44c. The front and rear cylinder block halves 12 and 14 have inner wall portions 12a and 14a having the central bore 26 arranged therein. The front inner wall portion 12a has a front supporting seat 12b, and the rear inner wall portion 14a has a rear supporting seat 14b. Each of the thrust bearings 40 and 42 comprise an inner ring 40a or 42a, an outer ring 40b or 42b, and rollers 40c or 42c.

The rear supporting seat 14b and the rear supporting seat 44c comprise flat surfaces which are axially opposite and radially parallel. The rear thrust bearing 42 is arranged between the rear supporting seat 14b and the rear supporting seat 44c so that the inner ring 42a thereof closely contacts the rear supporting seat 44c and the outer ring 42b thereof closely contacts the rear supporting seat 14b. Accordingly, the rear thrust bearing 42 is stably and rigidly held between the facing rear supporting seats 14b and seat 44c.

The front supporting seat 12b and the front supporting seat 44b also comprise flat surfaces which are axially opposite and radially parallel. However, the front supporting seat 44b of the boss 44a of the swash plate 44 is necessarily entirely flat, but only an annular portion is flat with a central portion in the annular portion recessed so as to facilitate machining with accuracy, as shown in FIG. 1. The front thrust bearing 40 is arranged between the front supporting seat 12b and the front supporting seat 44b, and a belleville spring 60 is arranged between the front thrust bearing 40 and the front supporting seat 44b of the boss 44a of the swash plate 44.

In this arrangement, the cylinder block halves 12 and 14, the housings 16 and 20, and the thrust bearings 40 and 42 can be fastened together by fastening bolts 24, so that the swash plate 44 is held between the thrust bearings 40 and 42. A variation in an axial fastening length or a fastening force of the fastening bolts 24 may occur, but such a variation is absorbed by a cushion function of the belleville spring 60, and it is possible to easily and stably control the fastening force of the fastening bolts 24.

In addition, the belleville spring 60 abuts against the supporting seat 44b of the swash plate 44 which is made from an abrasion resistant material, and accordingly, damage to the supporting seats 44b of the swash plate, occurring while the belleville spring 60 is moved with the swash plate 44, may be small, and it is not necessary to provide any measure to deal with damage to the supporting seat 44b, for example, it will not be necessary to provide a special plate or the like to receive the belleville spring. Also, it is possible to control the rigidity of the swash plate supporting structure by appropriately selecting a spring constant.

When the compressor is driven a moment acts on the swash plate 44 based on a compression reaction force. The rear thrust bearing 42 which is rigidly held and thus has no cushion function effectively prevents an unstable oscillation of the swash plate 44 by the rigidity of the rear thrust bearing 42 and, on the other hand, a variable axial load is efficiently absorbed by the cushion function of the belleville spring 60. Consequently, according to a comparative durability test of the above described compressor and of a prior art compressor employing elastically deformable thrust bearings, the result shows that fatigue destruction occurs in conventional thrust bearings at 300 hours, but fatigue destruction occurs in the thrust bearings of the embodiment beyond 1,000 hours.

It is possible to arrange the belleville spring 60 on any side of the boss 44a of the swash plate 44. However, when the compressor comprises the electromagnetic clutch 48 attached to the front end of the drive shaft 34, the drive shaft 34 is subjected to a force in the rearward direction of the compressor when the armature 54 is attracted. In this case, therefore, it is preferable that the rigidly supported thrust bearing 42 is arranged on the rear side of the swash plate 44, and the belleville spring 60 is arranged on the front side of the swash plate 44, so that the swash plate 44 is rigidly supported by the rigidly supported thrust bearing 42 against the force in the rearward direction and an unstable oscillation of the swash plate 44 is effectively prevented.

Figure 2:
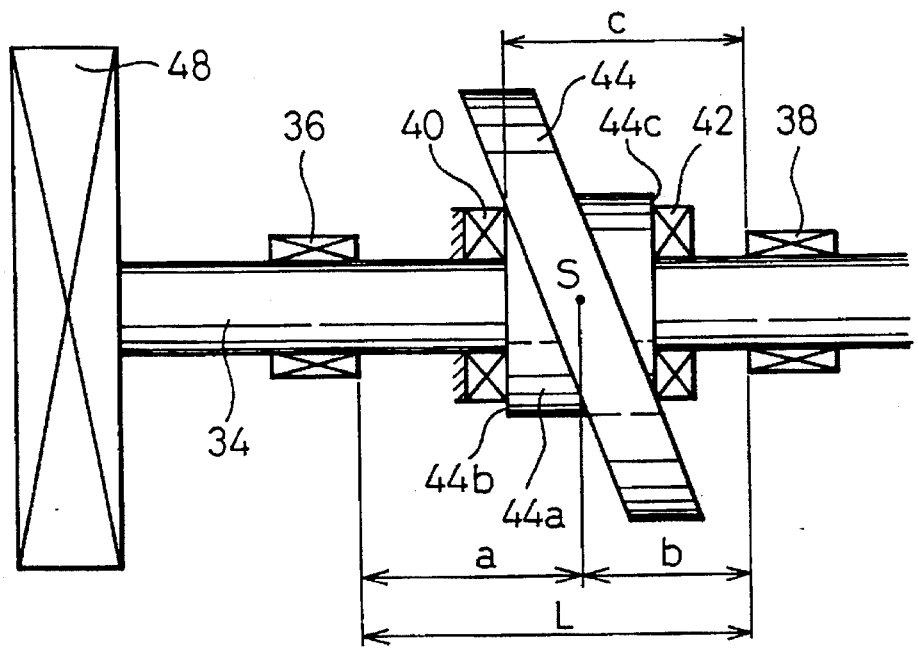
FIG. 2 is a partial diagrammatic view of a swash plate type compressor according to the second embodiment of the present invention.

FIG. 2 shows another embodiment of the present invention. The fundamental arrangement of the compressor 10 of FIGS. 1 and 3 is also applied to this embodiment. Therefore, the drive shaft 34 is rotatably supported by front and rear radial bearings 36 and 38 and front and rear thrust bearings 40 and 42, and one of the thrust bearings 40 and 42 is rigidly held. Also, the belleville spring 60 is arranged between the other thrust bearing and the swash plate 44, similar to the embodiment of FIG. 1. However, the rigidly supported thrust bearing is the front thrust bearing 40 in FIG. 2, and the supporting seat is shown by hatching.

In this type of the compressor, the longer the distance "L" between the front and rear radial bearings 36 and 38 is, the greater the drive shaft 34 tends to bend. On the other hand, the shorter the distance "L" is, the greater the drive shaft 34 tends to tilt. Therefore, the distance "L" is usually determined in consideration that both the bend and the tilt of the drive shaft 34 are properly controlled. The distance "L" determined in this way can be divided into the distance "a" between an axially central point "S" of the boss 44a of the swash plate 44 and the front radial bearing 36 and the distance "b" between the central point "S" of the boss 44a and the rear radial bearing 38. If the distance "L" is divided into identical distances "a" and "b" in the simple way, the distance "c" between the rigidly supported thrust bearing 40 and the rear radial bearing 38 is fixedly determined.

A moment induced by the compression reaction force and acting on the swash plate 44 is mainly supported by three components, i.e., the rigidly supported thrust bearing 40, the drive shaft 34, and the radial bearing 38 on the other side of the swash plate 44 from the rigidly supported thrust bearing 40. There is a tendency that a bend of the drive shaft 34 and a load applied to the thrust bearing 40 increase in proportion to the distance "c".

Therefore, it is preferable to arrange the front radial bearing 36 at such a position that the distance "a" between an axially central point "S" of the boss 44a of the swash plate 44 and the front radial bearing 36 is longer than the distance "b" between the central point "S" of the boss 44a and the rear radial bearing 38, and the rigidly supported thrust bearing 40 is arranged on the front side of the swash plate 44. Accordingly, it is possible to shorten the distance "c" between the rigidly supported thrust bearing 40 and the rear radial bearing 38.

In the above defined distance relationship, a bend in of the drive shaft 34 becomes small and a load acting on the rigidly supported thrust bearing 40 is mitigated, so it is possible to prevent a possible occurrence of flaking.

As explained above, according to the present invention, it is possible to absorb a variation of an axial fastening length during assembly of the compressor and to reduce an unstable oscillation of the swash plate, to thereby reduce an oscillation and a noise in the compressor during the high speed operation thereof and to increase the life of the thrust bearings. Also, it is possible to deal with a force acting on the drive shaft induced by the electromagnetic clutch, by arranging the rigidly supported thrust bearing on the rear side of the swash plate. Also, it is possible to reduce a bend in the drive shaft, and a load acting on the rigidly supported thrust bearing to prevent a possible occurrence of flaking, by arranging the front radial bearing at such a position that the distance between an axially central point of the boss of the swash plate and the front radial bearing is longer than the distance between the central point of the boss and the rear radial bearing, and by arranging the rigidly supported thrust bearing on the front side of the swash plate. In addition, the front radial bearing approaches the electromagnet clutch, and it is possible to mitigate the vibration of the drive shaft due to an offset of the center of gravity of the drive shaft derived from the electromagnet clutch supported, by the drive shaft, in a cantilevered fashion.

We claim:

1. A swash plate type compressor comprising:
    a cylinder block comprising axially arranged front and rear cylinder block halves, said cylinder block having a central bore, a plurality of cylinder bores around the central bore, a crank chamber intersecting the central bore and the cylinder bores, and inner wall portions having said central bore arranged therein and axially opposite front and rear supporting seats;

front and rear housings attached to the cylinder block and having central bores;

double headed pistons arranged in the respective cylinder bores to form compression chambers on either side of the pistons;

a drive shaft inserted in the central bores of the front housing and the cylinder block and rotatably supported by front and rear radial bearings and front and rear thrust bearings;

a swash plate arranged in the crank chamber and fixed to the drive shaft to engage with the pistons for reciprocatingly moving the pistons, said swash plate having a boss having axially opposite front and rear supporting seats, the front and rear supporting seats of the boss of the swash plate facing the front and rear supporting seats of the inner wall portions of the cylinder block, respectively;

one of the front and rear thrust bearings being rigidly arranged between one pair of the facing supporting seats;

the other of the front and rear thrust bearings being arranged between the other pair of the facing supporting seats; and a belleville spring arranged between said other thrust bearing and the supporting seat of the boss of the swash plate.

2. A swash plate type compressor according to claim 1, further comprising an electromagnetic clutch attached to the front end of the drive shaft, and wherein the rigidly supported thrust bearing is arranged on the rear side of the swash plate.

3. A swash plate type compressor according to claim 1, wherein the front radial bearing is arranged at such a position that a distance between an axially central point of the boss of the swash plate and the front radial bearing is longer than a distance between the central point of the boss of the swash plate and the rear radial bearing, and the rigidly supported thrust bearing is arranged on the front side of the swash plate.

4. The swash plate compressor of claim 1 wherein the belleville spring is arranged between the front thrust bearing and the front supporting seat of the boss of the swash plate.

5. The swash plate compressor of claim 1 wherein the front and rear supporting seats of the cylinder block and rear supporting seat of the swash plate boss are substantially flat over the width of a face of the thrust bearing with which they are in contact.

6. The swash plate compressor of claim 1 wherein the belleville spring is in direct contact with the thrust bearing and the swash plate boss.

7. The swash plate compressor of claim 5 wherein the belleville spring is in direct contact with the thrust bearing and the swash plate boss.

* * * * *